One United States Patent [19]
Zheng

[11] Patent Number: 5,535,201
[45] Date of Patent: Jul. 9, 1996

[54] TRAFFIC SHAPING SYSTEM USING TWO DIMENSIONAL TIMING CHAINS

[75] Inventor: Qin Zheng, Belmont, Mass.

[73] Assignee: Mitsubishi Electric Research Laboratories, Inc., Cambridge, Mass.

[21] Appl. No.: 438,352

[22] Filed: May 10, 1995

[51] Int. Cl.⁶ .................................................. H04Q 11/04
[52] U.S. Cl. ......................... 370/60.1; 370/84; 370/85.6; 370/96.2; 340/825.51
[58] Field of Search ........................... 370/17, 58.1, 58.2, 370/60, 60.1, 61, 84, 85.6, 94.1, 94.2, 104, 79; 340/825.5, 825.51, 825.52; 364/514, 569

[56] References Cited

U.S. PATENT DOCUMENTS

| | | | |
|---|---|---|---|
| 5,381,407 | 1/1995 | Chao | 370/60 |
| 5,392,280 | 2/1995 | Zheng | 370/60 |
| 5,432,713 | 7/1995 | Takeo et al. | 364/514 |
| 5,446,726 | 8/1995 | Rostoker et al. | 370/17 |
| 5,448,567 | 9/1995 | Dighe et al. | 370/94.2 |

*Primary Examiner*—Alpus H. Hsu
*Assistant Examiner*—Ricky Q. Ngo
*Attorney, Agent, or Firm*—Robert K. Tendler

[57] ABSTRACT

In an ATM network, a traffic shaping system is provided with a number of timing subchains each having slots at which cells are queued and each having a pointer to specify the readout of cells at a slot. The system eliminates the necessity for providing large numbers of slots for low data rate traffic while at the same time accommodating high data rate transmission by moving pointers for low data rate traffic at slower rates than pointers for higher data rates. In one embodiment, this is accomplished by increasing the time scale for slots far away from the current time by moving the time pointer increasingly slower for ever more distant slots. When a pointer is at a slot, cells queued at this slot are moved to a slot in the next prior subchain, with cells in the top subchain transmitted when selected by the associated pointer.

13 Claims, 4 Drawing Sheets

TRAFFIC SHAPING SYSTEM USING TWO DIMENSIONAL TIMING CHAINS

FIELD OF THE INVENTION

This invention relates to traffic control in a digital communication network and more particularly to a low-cost system for traffic shaping, scheduling, and dynamic rate control in a cell switched digital communication network.

BACKGROUND OF THE INVENTION

In a transmission of data over a cell switched digital communication network, such as an asynchronous transfer mode or ATM network, problems arise when multiple sources send data cells at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, a rate-based flow control system has been disclosed to prevent or inhibit excess data from entering the network. In a rate-based system, the rate at which the data is permitted to enter the network is controlled to not exceed a certain transmission rate, and this transmission rate is adjusted via a feedback signal from a network reflecting the congestion of the network. One such rate controlled system is described in an ATM Forum document #95-0013R2 entitled "Draft Version 3.0 of ATM Forum Traffic Management Specification Version 4.0" authored by Shirish S. Sathaye and David Hughes, April 1995.

One key element in implementing the above described rate-based flow control system is a traffic shaping unit which delays the traffic generated at a source and injects it at a rate no larger than that specified by a flow control scheme. One way to implement such a traffic shaping function is to use a timing chain. A timing chain is composed of an array of slots, with each slot representing one cell time defined as the time needed to transmit one cell of data at the full link transmission speed. A current time pointer points to a slot representing the current time or the current slot to cause cells at that slot to be transmitted, with the time pointer moving forward one slot every cell time. To control cell transmission rate where the rate is under R cells every cell time, at a time when a cell is transmitted, a new cell is scheduled in a slot which is 1/R slots away from the current slot. That is to say the cell is scheduled to be transmitted at a time which is delayed from the current time by a time equal to 1/R cell times. When the current time pointer moves to a slot, all cells queued at the slot become eligible for transmission.

However, one major problem with the above described timing chain approach is its high cost in supporting low rate traffic shaping which needs to delay cells for a long period of time. When the transmission rate R is small, 1/R becomes large. Thus, a timing chain needs a large number of slots, i.e., 1/R slots, to shape a transmission rate of R, making the system very expensive. Low data rate traffic in general refers to the transmission of text, as opposed to high data rate traffic such as full frame video. It is important that any network be capable of supporting both text transfer as well as video transmission as efficiently as possible, and be capable of reducing transmission rates of sources when the network is congested.

SUMMARY OF INVENTION

In order to support low transmission rate without resorting to a large number of slots, a two-dimensional timing chain system is provided. In general, shaping systems are used to delay the transmission of incoming cells based on the bandwidth assigned to this stream of cells. If incoming cells are merely loaded into a delay line, then for low data rate traffic, the length of delay before the cells are coupled to the network is quite long, requiring many slots and extremely long delay line. In order to efficiently shape the incoming traffic, this long delay line is divided up into so-called timing subchains. Each of the subchain has a number of consecutive slots into which incoming cells are stored.

By providing each of the subchains with its own pointer for reading out the cells of the slots, and by driving the pointer for each successive subchain at a slower rate than the previous subchain, it is possible to minimize the number of slots required to accommodate low data rate traffic, while at the same time, accommodating the high data rate traffic.

What has effectively been done by this system is to readout low data rate cells less frequently than the high data rate cells, although with less resolution. By moving the pointers for each subchain at successively lower speeds or rates, the delay of the cells through the shaping system can be realized using fewer slots.

The slot into which a cell is deposited is determined by the amount that the system would ordinarily delay the cell prior to its being coupled to the network. Each cell represents data which is to be transmitted through the network at a given data rate. For instance, full frame video requires a data rate of 1.5 Mbps, whereas text traffic may need to be reduced to a data rate of 10 Kbps when a network is congested. The slot into which a cell is placed depends upon the data rate for the traffic it represents. This means that a cell is deposited into that timing subchain which has a slot such that the time the cell in the slot takes to go through the whole chain being no less than 1/R cell times. R refers to a transmission rate in a unit of cells per cell time. R is dependent upon the acceptable data transmission rate for this stream of traffic through the network. For different virtual circuits, R can be different depending on the bandwidth allocated to this circuit. There are two types of connections for cell switched digital communication networks. The first has a fixed bandwidth for the entire length of the time that the connection is established through the network. The second has a variable bandwidth depending on feedback from the network. In either case, each incoming cell has an associated rate. Thus, each cell can be deposited into the appropriate slot in one of the subchains.

In summary, a two-dimensional timing chain can be viewed as a delay line capable of delaying cells for a very long period of timing without using a lot of slots. In one embodiment, a two-dimensional timing chain is thus composed of multiple subchains of slots at each of which one or more cells may be queued. Each subchain has its own time pointer which moves forward at its own pace. As the time pointers advance, cells queued at slots of bottom subchains are moved to that of upper subchains and cells of the first subchain are moved to transmission queues and from where they are transmitted. A two-dimensional timing chain is able to support low rate traffic shaping at any specified control accuracy using much fewer slots than that of a conventional timing chain. Priority traffic scheduling and dynamic rate control can also be easily supported with a two-dimensional timing chain.

More particularly, in an ATM network, a traffic shaping system is provided with a number of tinting subchains each having slots at which cells are queued and each having a pointer to specify the readout of cells at a slot. The system eliminates the necessity for providing large numbers of slots for low data rate traffic while at the same time accommodating high data rate transmission by moving pointers for low data rate traffic at slower rates than pointers for higher data rates. In one embodiment, this is accomplished by increasing the time scale for slots far away from the current time by moving the time pointer increasingly slower for ever more distant slots. When a pointer is at a slot, cells queued at this slot are moved to a slot in the next prior subchain, with cells in the top subchain transmitted when selected by the associated pointer. More particularly, in one embodiment, a two-dimensional timing chain is composed of multiple subchains of slots, with each pointer for a subchain being driven slower than the pointer associated with the subchain immediately above it. In one embodiment, one or more cells are queued at slots in a subchain, with each subchain having its own time pointer which moves forward at its own pace. Once the transmission rate R is defined, cells are then placed in a slot of a subchain which is 1/R cell times away from the time associated with the pointer of the first subchain. As the pointers advance, cells queued at slots of bottom subchains are moved to slots of upper subchains, with cells of the top subchain moved to transmission queues and from whence they are transmitted. The subject two-dimensional timing chain can thus support very low rate traffic and facilitate traffic scheduling and dynamic rate control without requiring a large number of slots.

BRIEF DESCRIPTION OF DRAWINGS

These and other features of the Subject Invention will be better understood in conjunction with the Detailed Description taken in accordance with the Drawings of which:

FIG. 9 is a schematic diagram illustrating a doubly linked list structure used to reschedule a cell already in a timing chain.

DETAILED DESCRIPTION

Figure 1:
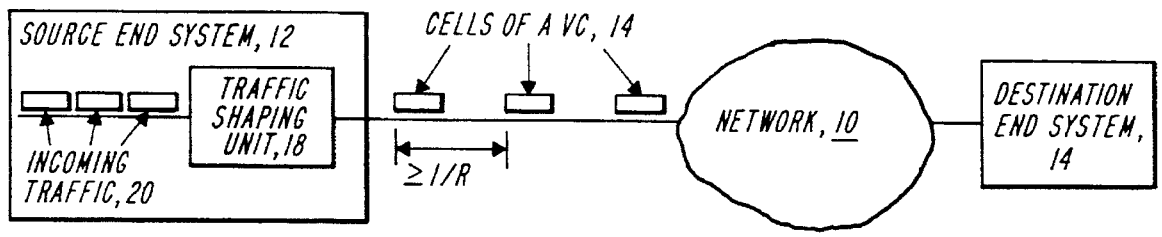
FIG. 1 is a schematic diagram illustrating a source end system in which data cells are rate controlled by a traffic shaping unit and are then transmitted over a network to a destination end system.

Referring now to FIG. 1, a network 10 is utilized to connect a source end system 12 at a source node to a destination end system 14 at a destination node. A source end system sends cells 14 to a destination end system by establishing a virtual circuit through the network. To avoid network congestion and cell losses, the cell transmission rate of each virtual circuit must be controlled under R cells every cell time. Different virtual circuits may have different values of R and R may also be dynamically changed according to a rate-based flow control scheme. Implementation of such a rate control function requires a traffic shaping unit 18 to delay incoming traffic 16 such that the time interval between two consecutive cells of a virtual circuit injected into a network be controlled to be no smaller than 1/R cell times. The subject invention provides a low cost implementation of traffic shaping unit 18.

Figure 2:
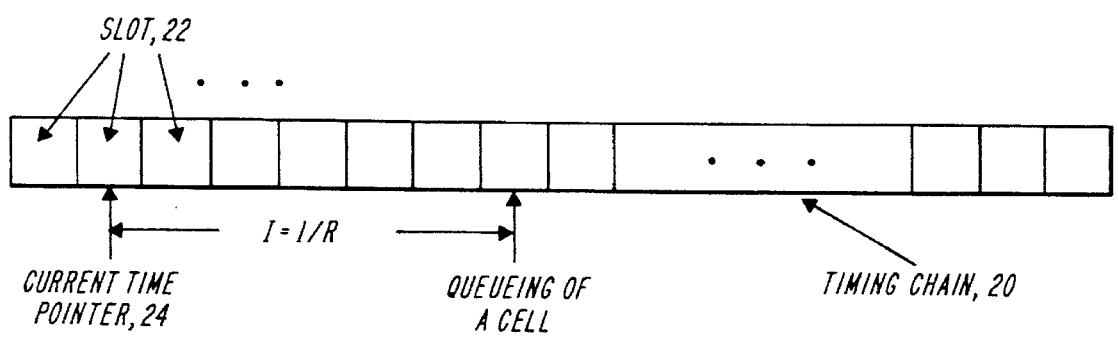
FIG. 2 is a schematic diagram illustrating the usage of a conventional one-dimensional timing chain for traffic shaping.

Referring now to FIG. 2, a timing chain 20 has previously been proposed to implement traffic shaping unit 18 of FIG. 1. A timing chain is composed of a number of slots 22 each representing one cell time. A current time pointer 24 points to a slot representing the current time and it moves forward one slot every cell time. When the time pointer reaches the end of a chain, it moves back to the first slot of the chain. When the current time pointer moves to a slot, any cells queued at the slot become eligible for transmission. To control the transmission rate of a virtual circuit assuming a rate of under R cells per cell time, at a time one cell of the virtual circuit is transmitted, a new cell is scheduled in a slot which is 1/R slots away from the slot that the current time pointer is pointing to, representing a time which is 1/R cell times delayed from the time. Notice that at most one cell per virtual circuit is scheduled in the chain. An arriving cell will not be scheduled until the previously scheduled cell of the same virtual circuit is transmitted. One major problem of using such a timing chain to implement a traffic shaping unit is that a large number of slots is required to support a low transmission rate such as that associated with text transmission, resulting in an expensive system.

Figure 3:
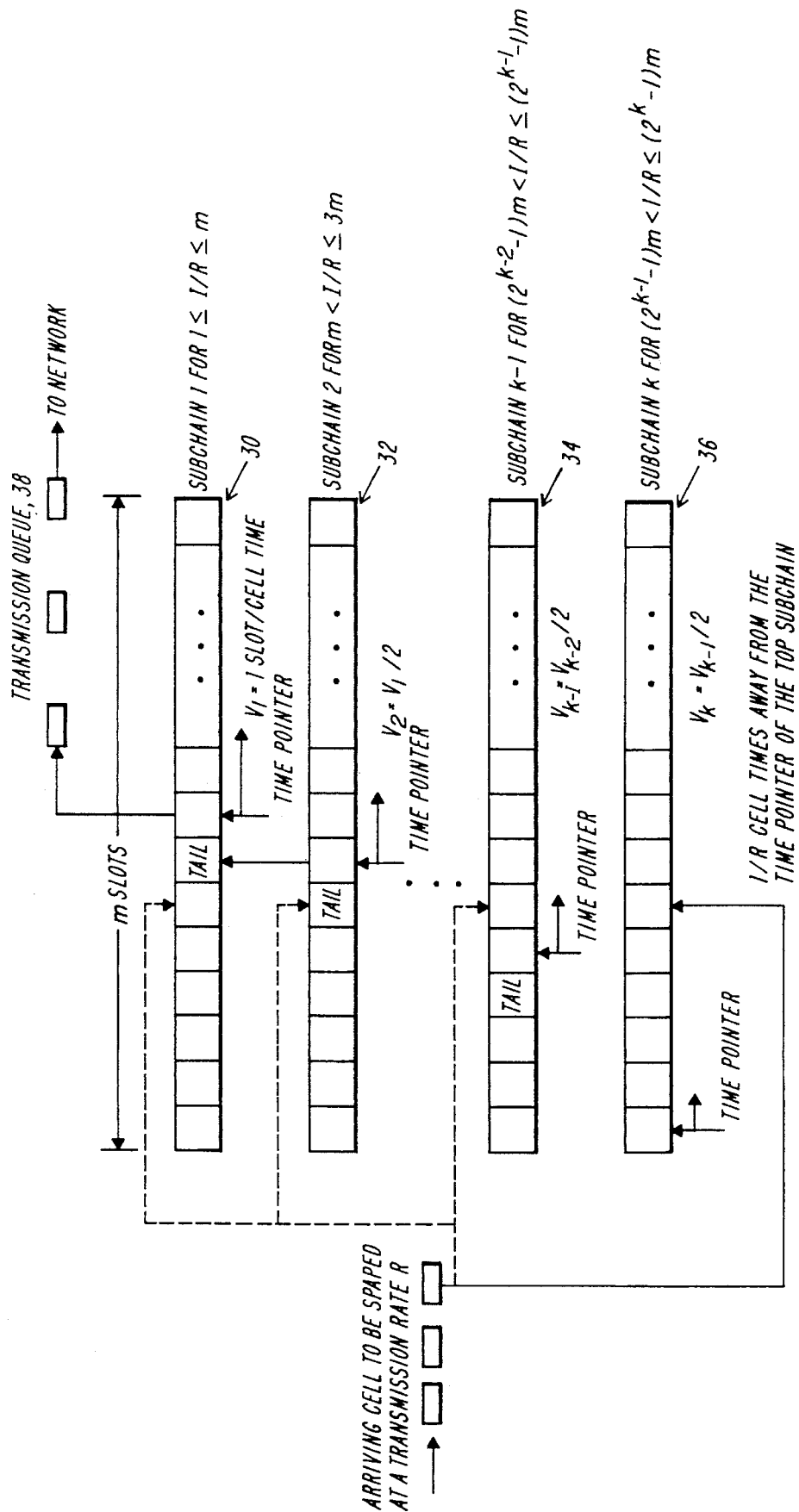
FIG. 3 is a schematic diagram illustrating an example of a two-dimensional timing chain.

Referring now to FIG. 3, the subject invention provides a two-dimensional timing chain system for traffic shaping unit 18 in FIG. 1 which is capable of supporting low rate traffic with fewer slots than that with the previously proposed one-dimensional timing chain system. In a preferred embodiment, an m×k two-dimensional timing chain is composed of k subchains 30, 32, 34, and 36 with each subchain having m slots and a time pointer. For i=1, . . . , k, each slot in the i-th subchain represents $2^{i-1}$ cell times, thus the time pointer of the i-th subchain moves forward one slot every $2^{i-1}$ cell times. When a time pointer reaches the end of a subchain, it moves back to the first slot of the subchain. Except for the first subchain 30, when the time pointer of the i-th subchain moves to a slot, any cells queued at the slot are transferred to the tail of the (i−1)-th subchain, which is defined as the slot that the time pointer has just left. For the first subchain 30, when the time pointer moves to a slot, cells queued at the slot are moved to a transmission queue 38 from where cells are transmitted. To control the transmission rate of a virtual circuit to under R cells per cell time, at a time when a cell of the virtual circuit is transmitted, a new cell is scheduled in a slot which is at least 1/R cell times away from the slot that the time pointer of the first subchain is pointing to. In other words, the cell should be placed in a slot such that it takes no less than 1/R cell times for the cell to be transferred into a transmission queue. At most one cell per virtual circuit can be scheduled in the chain and an arriving cell will not be scheduled until the previously scheduled cell is transmitted. If a cell arrives at a time when there is no cell of the virtual circuit in the timing chain, it is scheduled at a slot which is no less that 1/R cell times away from either the current time or the time when last cell of the virtual circuit was An m×k two-dimensional timing chain as described above can delay a cell for a maximum of $(2^{k-1})$m cell times, thus supporting a lowest transmission rate of $B_{link}/((2^{k-1})m)$ where $B_{link}$ is the transmission bandwidth of the link connecting the source end system and the network. Except for the first subchain for which the rate control accuracy is the same as that of the one-dimensional timing chain, a rate control accuracy of $\delta R/R=2/m$ is guaranteed, where R is the target rate to be controlled, and $\delta R$ is the rate error introduced by the timing chain mechanism. Thus one may select an appropriate value of m to satisfy any rate control accuracy requirement. Notice that by synchronizing the advances of time pointers, a rate control accuracy of 1/m is achievable. Alternatively, one may coordinate the advances of time pointers in such a way that at most two pointers move forward at any given time, thus minimizing the maximum number of accesses to a timing chain in one cell time. For example, for a two-dimensional timing chain with four subchains, the advances of time pointers can be coordinated as follows: (1,2),(1,3),(1,2),(1,4),(1,2),(1,3),(1,2),(1,*), ..., (repeating the pattern), where (i,j) means pointers of subchains i and j move forward together in one cell time.

The following example shows advantages of a two-dimensional timing chain over a one-dimensional timing chain. Suppose $B_{link}$=155 Mbps. Using 1K slots, a 64×16 two-dimensional timing chain can support a lowest rate of $155/((2^{16}-1)\times64)$ Mbps=0.04 Kbps with a rate control accuracy of 2/64=3.1%. On the other hand, a one-dimensional timing chain with the same number of 1K slots can only support a lowest rate of 155/1024 Mbps=151 Kbps. This shows that with the same number of slots, a two-dimensional timing chain can support a rate which is several thousand times lower than that a one-dimensional timing can support.

Note that as cells arrive having different rates, they are queued in the subchains having slots that are the correct 1/R distance away, e.g. are associated with the correct delay. That subchain also has a pointer moving at the appropriate speed such that the number of slots can be minimized. This shows that low rate traffic can be accommodated with a minimum of slots due to the slower speed of the pointer associated with the subchain into which these low rate cells are deposited.

It should be noted that the two-dimensional timing chain system depicted in FIG. 3 is only an example showing how a low cost traffic shaping unit can be implemented with a timing chain in which pointers for different subchains move forward at different speeds to support low rate traffic shaping and at the same time maintain a high control accuracy. Variations of this mechanism can be easily constructed to achieve different rate control accuracies and lowest supportable transmission rates.

Figure 4:
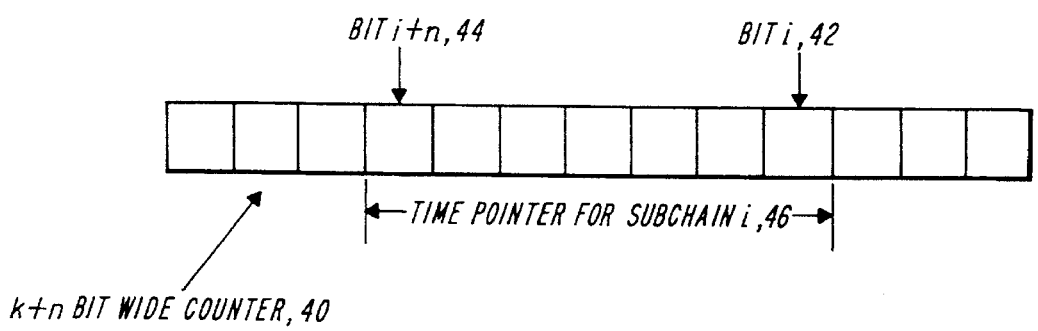
FIG. 4 is a schematic diagram illustrating the queueing of cells at a slot using a linked list data structure.

Referring now to FIG. 4, for a two dimensional timing chain depicted in FIG. 3, if the number of slots in each subchain is of powers of 2, say $m=2^n$, then the k time pointers of an m×k two-dimensional timing chain as depicted in FIG. 3 can be implemented with just a single (k+n)-bit wide counter 40. Specifically, for i=1, ..., k, the bits between bit i 42 and bit i+n 44 of the counter can serve as the time pointer 46 for subchain i. In other words, the binary value represented by bit i to bit i+n identifies the slot in subchain i to which the time pointer is pointing.

Figure 5:
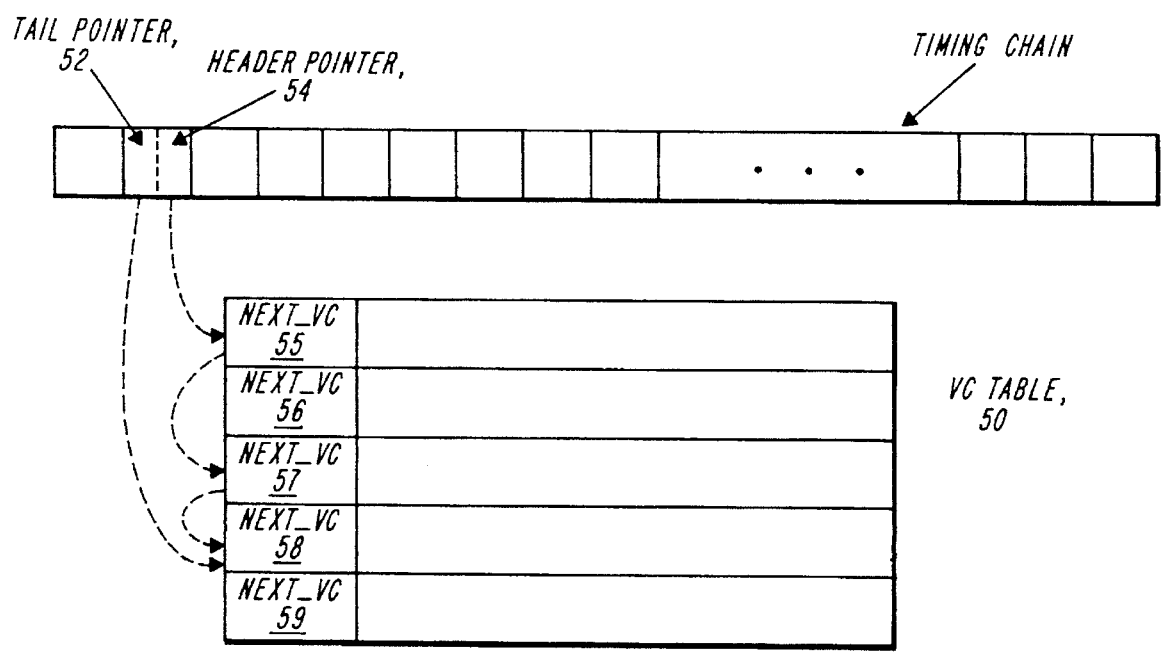
FIG. 5 is a schematic diagram illustrating the implementation of multiple priority cell transmission scheduling with the timing chain approach.

Referring now to FIG. 5, queueing of cells at a slot can be implemented using a linked list data structure. Since each virtual circuit can at most have one cell queued in a timing chain, a queue of cells can actually be implemented as a queue of virtual circuits which can be implemented by adding next_vc pointers 55–59 in a virtual circuit table 50 with each next_vc pointer pointing to the next virtual circuit in a linked list. A tail pointer 52 and a header pointer 54 are stored in each slot of a timing chain 56 pointing to the header and tail of a linked list, respectively. The transmission queue 36 in FIG. 3 can also be implemented in this way by using a header pointer and a tail pointer. Addition of a virtual circuit to a queue and move a queue to the end of the transmission queue can be accomplished with the usual linked list pointer operation without requiring actual movement of virtual circuits or cells.

Figure 6:
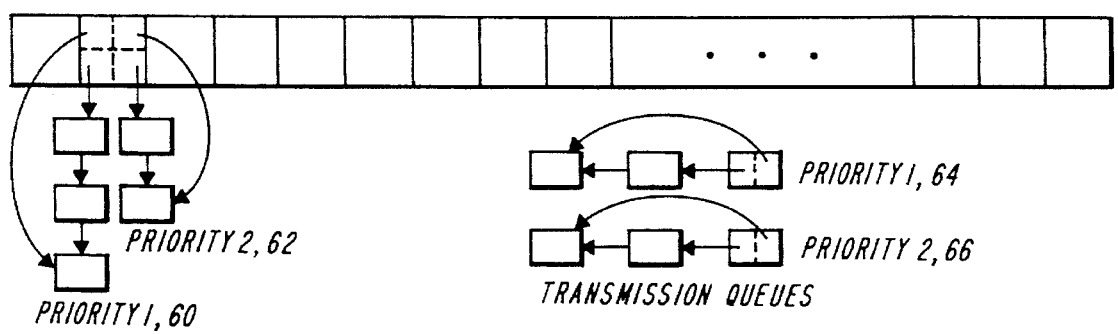
FIG. 6 is a schematic diagram illustrating another way of implementing multiple priority scheduling with the timing chain approach.

Referring now to FIG. 6, priority scheduling can be supported by using multiple queues 60 and 62 in parallel at each slot and multiple transmission queues 64 and 66. When a cell is scheduled at a slot, it is put at the end of its corresponding priority queue at the slot. When the time pointer advances, queues at slots are concatenated at the end of transmission queues of the same priority levels. Cells in a transmission queue of a higher priority are transmitted before those in a transmission queue of a lower priority. Priority scheduling is useful when some virtual circuits have transmission priority over others. For example, virtual circuits transferring video/audio data usually have priority over virtual circuits transferring text data to ensure timely delivery of real-time video/audio signals.

Figure 7:
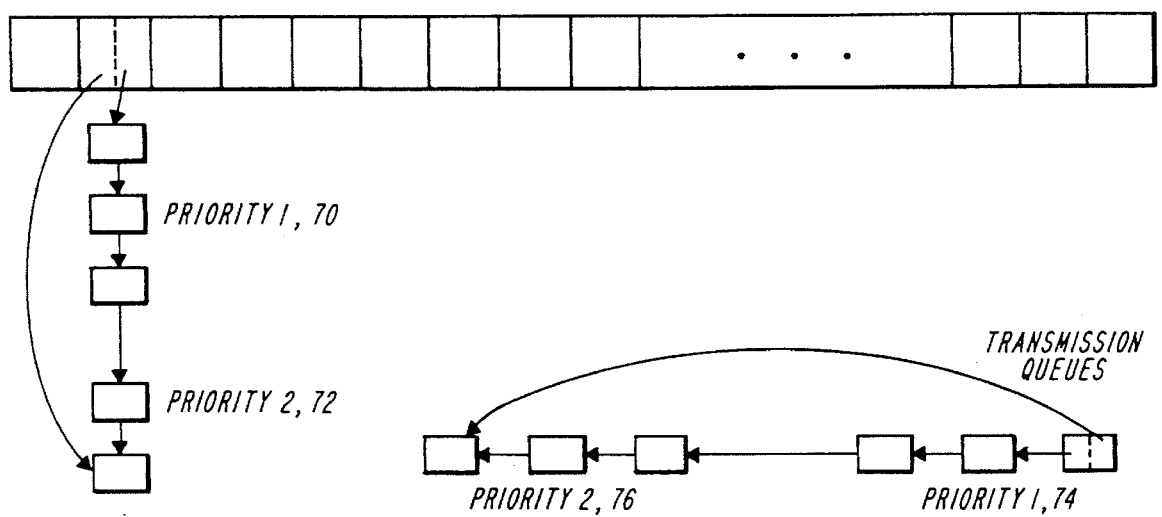
FIG. 7 is a schematic diagram illustrating how pointers to the next next priority can be added to expedite searching for the scheme illustrated in FIG. 6.

Referring now to FIG. 7, priority scheduling can also be supported by arranging priority queues 70 and 72 at slots and the transmission queues in serial 74, 76 in serial. One advantage of this data structure as compared to that depicted in FIG. 6 is its ability to accommodate many priority levels without requiring each slot to hold a large number of pointers to each of the priority queues. However, search operations are needed to add a cell of a certain priority to its corresponding position in the serial priority queues or merge two queues together while keeping the orders of cells according to their priorities.

Figure 8:
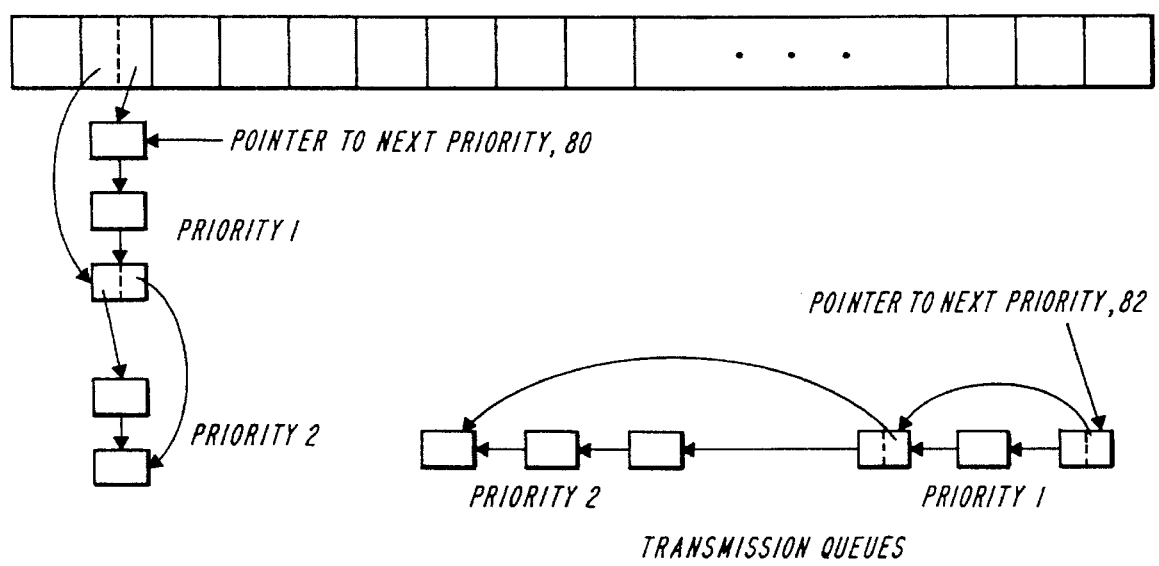
FIG. 8 is a schematic diagram illustrating a doubly linked list queueing structure to facilitate cell rescheduling and fast pate update.

Referring now to FIG. 8, pointers 80 and 82 can be added to the system in FIG. 6 to expedite searching. Specifically, to add a cell of low priority to a serial priority queue, one does not need to search through all cells of higher priorities to find the right position. Instead, pointers to the next priority can be used to directly find the tail of the queue of the next priority level.

Finally, referring to FIG. 9, a doubly linked list structure 90 can be used to reschedule a cell already in a timing chain and achieve fast rate update. In the example depicted in FIG. 9, a cell belonging to virtual circuit 94 can be removed from a tinting chain by simply removing links 98 and links 100, and adding a new links 102 in the virtual circuit table. The removed cell can be rescheduled into the tinting chain using a new rate value R. In this way, the transmission rate of a virtual circuit can be changed dynamically without having to wait after the previous scheduled cell of the virtual circuit is transmitted.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a cell switched digital communication network in which cells of data are transmitted from a source end system to a destination end system at a rate no greater than a value specified by the network, said network having a highest data rate and a lowest data rate for which said network is designed, a traffic shaping system coupled to incoming traffic for controlling cell transmissions over said network comprising:

a RAM having memory units, a series of memory units establishing a timing subchain each divided into slots with each slot adapted to receive a cell, said RAM having a number of said subchains arranged from highest to lowest to form highest and lowest subchains, each of said subchains having a timing pointer which moves from one slot to the next at a predetermined speed, with the arrival of said pointer at a slot enabling the transfer of a cell at said slot, said subchains being ordered by the speed from highest pointer speed to slowest pointer speed with which its associated pointer is driven, the fastest pointer speed associated with said highest data rate transmissions for which said network is designed denoting said highest subchain and said slowest pointer speed for said lowest data rate transmissions for which said network is designed denoting said highest subchain and said slowest pointer speed for said lowest data rate transmissions for which said network is designed denoting said lowest subchain;

means coupled to the timing pointer for each of said subchains for transferring a cell from a pointer-selected slot; and, means for transferring incoming calls into slots of that subchain having a pointer speed corresponding to the data rate of said incoming cells.

2. The system of claim 1 wherein the transfer of incoming cells to said network is delayed by said traffic shaping system and wherein the slot of the subchain to which an incoming cell is transferred is that slot which corresponds to the delay in the transmission of said cell through said traffic shaping system to said network.

3. The system of claim 2 wherein said cells are associated with a particular type of cell traffic having a predetermined allowed data rate, and wherein said delay is no smaller than 1/R where R is the data rate specified by said network for said particular type of cell traffic.

4. The system of claim 1 wherein said cell transferring means includes means for transferring a cell in one slot of a subchain into a slot immediately preceding the pointer associated with the immediately preceding subchain and means for coupling the cell selected by the fastest speed pointer to said network.

5. The system of claim 1 and further including means for queueing cells at a slot so as to form priority queues, and means for queueing the outputs of said slots for transmission to said network thus to form transmission queues.

6. The system of claim 5 wherein said means for queueing the output of said slots includes a linked list data structure.

7. The system of claim 6 wherein said linked list data structure includes a linked list of virtual circuits, each entry thereof having a header and a tail, a virtual circuit table having a series of next virtual circuit pointers arranged therein, successive virtual circuit pointers pointing to successive virtual circuits, a tail pointer and a head pointer in each of said slots pointing respectively to a corresponding header and tail of said linked list, whereby a queue of cells corresponding to the outputs of said slots is implemented as a queue of virtual circuits, with an element added to a queue or with two queues merged together with simple pointer operations.

8. The system of claim 5 wherein said means for queueing cells at a slot includes multiple priority queues at said slot and means for scheduling a cell at a slot such that a cell is put at the end of its corresponding priority queue, and means for concatenating outputs of slots at the end of the transmission queue associated with the same priority levels of priority queues at different slots responsive to advances of the corresponding pointer associated with the slot of the corresponding subchain.

9. The system of claim 5 wherein said means for queueing cells at a slot includes a number of serial priority queues at a slot and wherein said means for queueing the outputs of said slots includes means for queueing said serial priority queues for transmission of cells of said network.

10. The system of claim 9 and further including additional pointers to expedite searching to add a cell of predetermined priority to its corresponding position in said serial priority queues, whereby pointers to the next priority can be used directly to find the tail of the queue of the next priority level, thereby to permit adding a cell of low priority to a serial priority queue without searching through all cells of higher priority to find the appropriate position.

11. The system of claim 5 wherein said means for queueing the outputs of said slots includes a doubly linked list structure, said doubly linked list structure permitting rescheduling a cell already in a timing chain.

12. The system of claim 11 and further including pointers coupled to said doubly linked list structure for recovering a cell from a timing chain by removing appropriate links from said list and adding new links to said list.

13. The system of claim 12 and further including means for rescheduling a removed cell including means for using a new data rate value, to thereby permit adjustment of the amount of traffic sent over said network.

* * * * *